(12) United States Patent
Mathur

(10) Patent No.: US 12,519,865 B2
(45) Date of Patent: Jan. 6, 2026

(54) MULTIPLE MODEL INJECTION FOR A DEPLOYMENT CLUSTER

(71) Applicant: HEWLETT PACKARD ENTERPRISE DEVELOPMENT LP, Houston, TX (US)

(72) Inventor: Kartik Mathur, Santa Clara, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 477 days.

(21) Appl. No.: 17/531,068

(22) Filed: Nov. 19, 2021

(65) Prior Publication Data

US 2022/0078264 A1 Mar. 10, 2022

Related U.S. Application Data

(62) Division of application No. 16/809,414, filed on Mar. 4, 2020, now Pat. No. 11,206,316.

(51) Int. Cl.

| | |
|---|---|
| *G06F 9/455* | (2018.01) |
| *G06F 8/36* | (2018.01) |
| *G06F 9/445* | (2018.01) |
| *G06F 9/50* | (2006.01) |
| *G06F 9/54* | (2006.01) |

(Continued)

(52) U.S. Cl.
CPC ............. *H04L 67/34* (2013.01); *G06F 8/36* (2013.01); *G06F 9/44505* (2013.01); *G06F 9/44536* (2013.01); *G06F 9/45558* (2013.01); *G06F 9/5077* (2013.01); *G06N 5/04* (2013.01); *H04L 41/0895* (2022.05); *G06F 2009/45591* (2013.01); *G06F 2009/45595* (2013.01); *G06F 9/547* (2013.01); *G06F 2209/501* (2013.01); *G06F 2209/503* (2013.01)

(58) Field of Classification Search
CPC ... G06F 9/44–44584; G06F 8/36; G06F 9/547
See application file for complete search history.

(56) References Cited

U.S. PATENT DOCUMENTS

| | | |
|---|---|---|
| 10,732,952 B1 | 8/2020 | Yu et al. |
| 2018/0081645 A1* | 3/2018 | Alurralde Iturri ........ G06F 8/35 |

(Continued)

OTHER PUBLICATIONS

INFaaS: A Model-less Inference Serving System Francisco Romero, Qian Li, Neeraja J. Yadwadkar, Christos Kozyrakis Version 5; arXiv:1905.13348v5 arxiv.org/abs/1905.13348v5 (Year: 2019).*

(Continued)

*Primary Examiner* — April Y Blair
*Assistant Examiner* — Paul V Mills
(74) *Attorney, Agent, or Firm* — Hewlett Packard Enterprise Patent Department

(57) ABSTRACT

Systems and methods are provided for servicing inference request by one of multiple machine learning models attached to a deployment cluster. The API server of a deployment cluster is not tightly coupled to any of multiple machine learning models attached to the deployment cluster. Upon receiving an inference request, the deployment cluster can retrieve the configuration parameters, including serialization formatting, for a target model identified in the inference request. The deployment cluster can utilize the retrieved parameters to service the inference request and return the results to a business system application.

24 Claims, 5 Drawing Sheets

(51) Int. Cl.
*G06N 5/04* (2023.01)
*H04L 41/0895* (2022.01)
*H04L 67/00* (2022.01)

(56) References Cited

U.S. PATENT DOCUMENTS

| | | | | |
|---|---|---|---|---|
| 2018/0084063 | A1* | 3/2018 | Miedema | H04L 67/51 |
| 2019/0005411 | A1* | 1/2019 | Eads | G06F 16/2246 |
| 2019/0034763 | A1 | 1/2019 | Bernat et al. | |
| 2019/0042955 | A1 | 2/2019 | Cahill et al. | |
| 2019/0138908 | A1 | 5/2019 | Bernat et al. | |
| 2019/0171950 | A1 | 6/2019 | Srivastava | |
| 2019/0325353 | A1* | 10/2019 | Aftab | G06F 8/30 |
| 2020/0012584 | A1 | 1/2020 | Walters et al. | |
| 2020/0027210 | A1* | 1/2020 | Haemel | G06F 9/547 |
| 2020/0082056 | A1 | 3/2020 | Hasegawa | |
| 2020/0160986 | A1* | 5/2020 | Vegas Santiago | G06N 5/01 |
| 2020/0210867 | A1* | 7/2020 | Banis | G06N 20/00 |
| 2020/0364606 | A1 | 11/2020 | Sawant et al. | |
| 2020/0395004 | A1 | 12/2020 | Yamasaki et al. | |
| 2021/0035012 | A1* | 2/2021 | Beaty | G06N 20/00 |
| 2021/0055977 | A1* | 2/2021 | Lisuk | H04L 67/133 |
| 2021/0342694 | A1* | 11/2021 | Zhu | G06N 3/082 |

OTHER PUBLICATIONS

Clipper: A Low-Latency Online Prediction Serving System Daniel Crankshaw, Xin Wang, Giulio Zhou, Michael J. Franklin, Joseph E. Gonzalez, Ion Stoica (Year: 2017).*

Swayam: Distributed Autoscaling to Meet SLAs of Machine Learning Inference Services with Resource Efficiency Arpan Gujarati, Sameh Elnikety, Yuxiong He, Kathryn S. McKinley, Björn B. Brandenburg (Year: 2017).*

Accelerating the Machine Learning Lifecycle with MLflow Matei Zaharia, Andrew Chen, Aaron Davidson, Ali Ghodsi, Sue Ann Hong, Andy Konwinski, Siddharth Murching, Tomas Nykodym, Paul Ogilvie, Mani Parkhe, Fen Xie, Corey Zumar (Year: 2018).*

TrIMS: Transparent and Isolated Model Sharing for Low Latency Deep Learning Inference in Function-as-a-Service Abdul Dakkak, Cheng Li, Simon Garcia de Gonzalo, Jinjun Xiong, and Wen-mei Hwu (Year: 2019).*

Publishing and Serving Machine Learning Models with DLHub Ryan Chard, Logan Ward, Zhuozhao Li, Yadu Babuji, Anna Woodard, Steven Tuecke, Kyle Chard, Ben Blaiszik, and Ian Foster (Year: 2019).*

Orchestration of machine learning workflflows on Internet of Things data Jose Miguel Alves, (Year: 2019).*

Core utility development for hysia performance Zhou ShengSheng (Year: 2019).*

Packaging and Sharing Machine Learning Models via the Acumos AI Open Platform Shuai Zhao, Manoop Talasila, Guy Jacobson, Cristian Borcea, Syed Anwar Aftab, and John F Murray (Year: 2018).*

\* cited by examiner

MULTIPLE MODEL INJECTION FOR A DEPLOYMENT CLUSTER

CROSS REFERENCE TO RELATED APPLICATIONS

This application is a division of, and claims the priority benefit of, U.S. patent application Ser. No. 16/809,414, filed on Mar. 4, 2020, issued as U.S. Pat. No. 11,206,316, the contents of which are incorporated herein by reference in their entirety.

DESCRIPTION OF RELATED ART

Machine learning can refer to methods that, through the use of algorithms, are able to automatically turn data sets into models. In turn, those models are capable of making predictions based on patterns or inferences gleaned from other data. There has been a push to implement machine learning in enterprise environments, e.g., businesses, so that these entities may leverage machine learning to provide better services and products to their customers, become more efficient in their operations, etc. Implementing machine learning into the enterprise context, also referred to as operationalization, can involve the deployment (and management) of models, i.e., putting models into production. In order for enterprise entities to achieve operationalization and to make deployment useful for an enterprise, models should be made available for use by different systems within the enterprise. For example, operationalization allows different systems, e.g., within an enterprise or similar organization, to send different data/types of data to a model to obtain a prediction, which are in turn populated back into the different systems.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1:
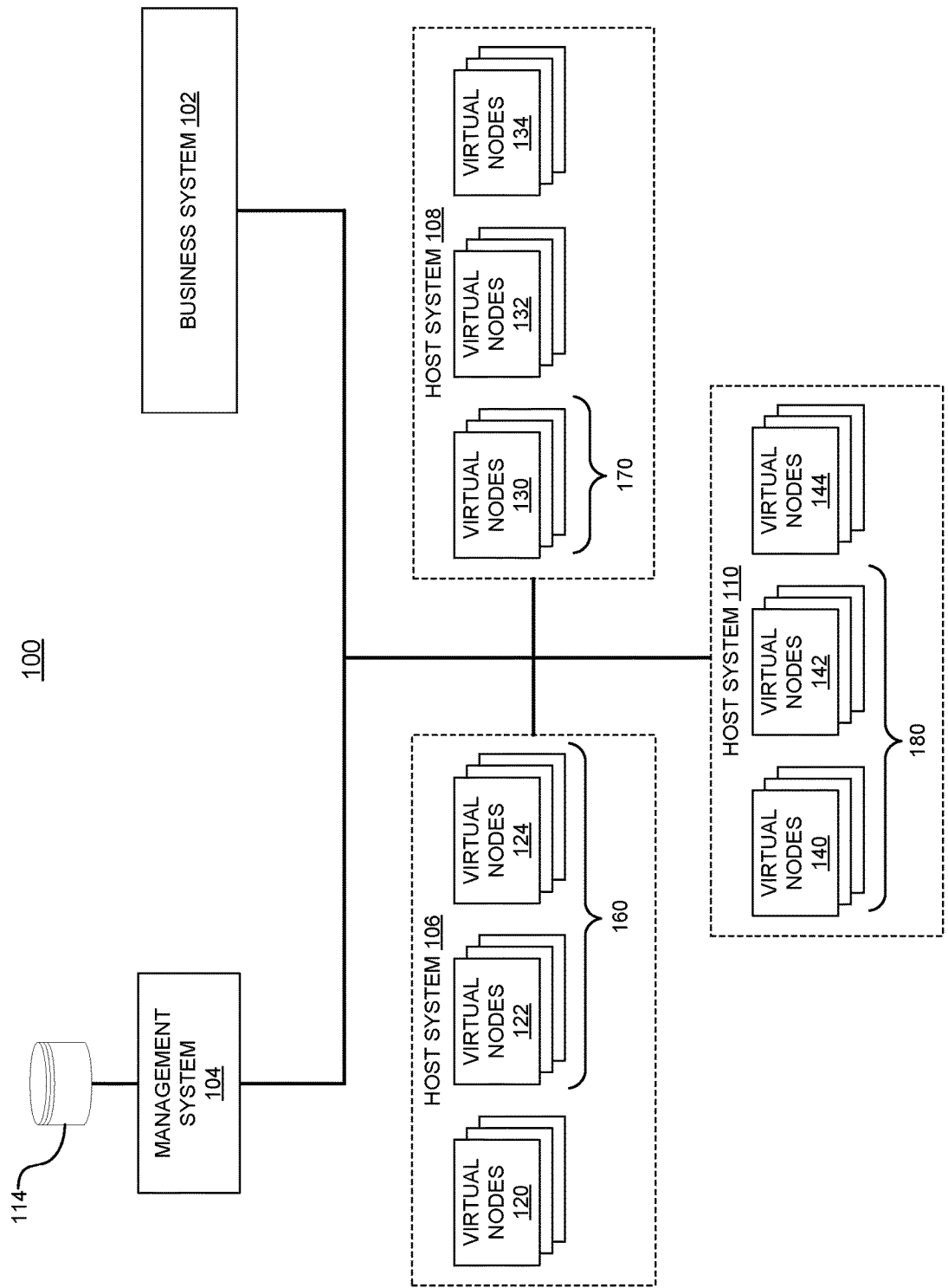
FIG. 1 is an example environment in accordance with embodiments of the technology disclosed herein.

The figures are not exhaustive and do not limit the present disclosure to the precise form disclosed.

DETAILED DESCRIPTION

As alluded to above, operationalization of machine learning can involve model deployment. Model deployment can involve how information is transmitted to/from the location (s) where a model is executing in order to make that model available to different systems within an enterprise, e.g., business systems, such as supply chain management systems, customer relationship management systems, enterprise resource planning systems, etc. At a high level, a model may be deployed or published using an application programming interface (API) server. Some client or user which seeks a prediction (inference request) may input data to the API server (which may be using the Representational state transfer (REST) architecture or a remote procedure call (RPC) client). In return, the API server may output a prediction.

Current approaches to operationalizing models rely on tightly coupling a given model type to an API server on which the model is executing. To provide some background, an API generally refers to a set of rules that allow programs to talk to each other (here, the process on which the model is executing which can be identified by a Uniform Resource Locator (URL), and the API server on which a Representational State Transfer (REST) API is defined). REST refers to a set of rules followed when creating an API, and a REST API can be thought of a mechanism that returns a list of results based on a search for something from some service. In particular, the REST API can return data (a resource or response) upon linking to a specific Uniform Resource Locator (URL) (a request). In the context of model deployment and operationalization, an API endpoint for each model is exposed in order for business systems to access the model, and send inference requests. The API endpoint can refer to a host: port combination of the process executing the model (the port being the Transmission Control Protocol (TCP) port on which the process is listening).

The tight coupling noted above refers to the need in conventional operationalization frameworks to have all the information regarding a model, e.g., what library/libraries were used to train the model, the serialization format used for the model, in addition to other model-related metadata, are known only to a particular API server. Due to how tightly a model and an API server are coupled, inference requests to an API server can only be served by the API server for the specific model to which it is coupled. Accordingly, the technology disclosed herein "de-couples" models and API servers, where instead, a model attachment feature/functionality is provided that allows any or all metadata relevant to a given model type to be made available to any API server process. As an added advantage, no downtime is involved, and new models can be served by API servers (in contrast to conventional operationalization frameworks, where for a new model type, a new API endpoint is required, and the new API endpoint must be instantiated).

Further still, the technology disclosed herein provides systems and methods for machine learning model deployment wherein multiple models can be deployed on the same computing or deployment cluster and referenced during the same session. That is, and is discussed above, operationalization involves scaling models to production, where potentially millions of inference requests may be sent/received per second. Accordingly, an enterprise sets forth clusters or groups of API servers (along with load balancers) capable of handling such voluminous inference requests without unnecessary delay. in accordance with various embodiments, an API server of a deployment cluster is agnostic as to the underlying model type for which an inference request is received. Thus, any API server within a deployment cluster is able to run any model or multiple models, where the multiple models all use the same runtime environment. A runtime environment in this context, can refer to the different libraries needed to support the model upon serialization. Runtime environment information can be part of the metadata associated with a model/model type that can be passed to an API server, allowing that API server to serve inference requests for any model for which it has obtained the relevant metadata (also referred to as asynchronous attachment).

In various embodiments, a deployment cluster can be configured with multiple runtime environments. This enables the deployment cluster to service multiple models for which a runtime environment is installed on the deployment cluster. The serialization and other configuration parameters necessary to define the runtime environment are maintained in a data structure managed by a management system of a networked system, which can be provided to a deployment cluster when a specific model is attached. When the cluster receives an inference request identifying a specific model, the API server can retrieve the runtime configuration parameters for that model and serve the inference request without the need to instantiate the API server specifically for that model. Therefore, the API server is not so tightly coupled to the model such that the API endpoint can omit runtime-specific configuration information. This reduces the downtime between adding or removing models from a cluster because the deployment engine can continue to run without the need to re-instantiate the API endpoints of the API server to tie it closely to a given model.

FIG. 1 illustrates an example environment 100 in which embodiments of the technology disclosed herein are practiced. The environment 100 is provided for illustrative purposes only and is not intended to limit the scope of the technology to only the depicted environment. As shown in FIG. 1, the environment 100 includes a business system 102, a management system 104, and a plurality of host systems 106, 108, 110, all communicatively coupled to each other over a communications network. The solid black line connecting the various elements of environment 100 may be a wired connection, a wireless connection, or a combination thereof, depending on the implementation. In various embodiments, the environment 100 may be implemented in a private cloud, a public cloud, a hybrid cloud, or other type of communications network.

The environment 100 provides a network environment for implementing machine learning models. The business system 102 can be any application within a network configured to provide some functionality to an end user. Each business system 102 may leverage one or more machine learning models to gain further insights into obtained data to help the business system 102 more accurately and effectively provide intended results to the end user. As a non-limiting example, an example business system 102 may be designed to identify the presence of one or more items or persons in a location based on captured images. The business system 102 could more effectively identify the items or persons by sending image data to one or more machine learning models of the environment 100 that are designed and trained to identify the one or more items or persons (e.g., face recognition models, scene parsing models, etc.). Although shown as a single system, the business system 102 can comprise a plurality of different business systems and applications. In some embodiments, the business system 102 can be one or more types of computing devices, including but not limited to a laptop, a desktop, a tablet, a server, among others. In some embodiments, the business system 102 may access the environment 100 through a web portal or other access point. In various embodiments, the business system 102 can also be realized as another host system (similar to host systems 106, 108, 110) within the environment 100 (i.e., also referred to as an "application cluster"). When implemented as an application cluster, the business system 102 can comprise a plurality of virtual nodes (similar to the virtual nodes discussed below with respect to the host system 106, 108, 110) that represent the application cluster within environment 100.

As suggested by its name, the management system 104 manages the environment 100. The management system 104 can be configured to deploy clusters within the environment 100 using the host systems 106, 108, 110. These clusters may each comprise one or more virtual nodes to process data sets in parallel and perform specific operations within the environment 100. The clusters may deploy data processing frameworks or applications that may comprise Hadoop, Spark, TensorFlow, or other distributed data processing frameworks (i.e., compute engine). In various embodiments, storage repositories may be located on one or more other computing systems, such as server computers, desktop computers, or some other computing systems. The storage repositories may each represent data stored as a distributed file system, as object storage, or as some other data storage structure. Each deployment cluster can have an associated application programming interface (API) server configured for dependent distribution to allocate large-scale processing clusters in the environment 100, such as the dependent distribution described in U.S. Patent Publication No. 2017/0208138 titled "Allocating Edge Services With Large-Scale Processing Framework Clusters," which is hereby incorporated herein in its entirety.

The management system 104 can be configured to deploy one or more deployment clusters with one or more machine learning models attached therewith. Deployment of clusters and the deployment of machine learning models can be performed separately, with the deployment clusters being initialized without any machine learning models at the start, with machine learning models being attached while the deployment cluster is running. In deploying the deployment clusters, the management system 104 may be responsible for allocating computing resources of the host systems 106, 108, 110 to the clusters, and deploying the virtual nodes required for the clusters. The virtual nodes may comprise full operating system virtual machines or containers. The containers may comprise Linux containers, Docker containers, and other similar namespace-based containers. Rather than requiring a separate operating system, which is required for virtual machines, containers may share resources from the host computing system, wherein the resources may include kernel resources from the host operating system and may further include repositories and other approved resources that can be shared with other containers or processes executing on the host. However, although resources may be shared between the containers on a host system, the containers are provisioned to have private access to the operating system with their own identifier space, file system structure, and network interfaces. The operating system may also be responsible for allocating processing resources, memory resources, network resources, and other similar resources, to the containerized endpoint.

For managing the environment 100, the management system 104 can maintain one or more data structures that can be used to store configuration information associated with each of the machine learning models deployed thereon. The one or more data structures may be stored in a database (not shown in FIG. 1) communicatively coupled to the management system 104. In some embodiments, management system 104 may be deployed as a separate cluster of computing devices within the environment 100, as a cluster of virtual nodes on a host system (e.g., host system 110), or a combination thereof. The database can be one or more local, non-transitory, machine-readable storage media associated with the management system 104, one or more remote, non-transitory, machine-readable storage media communicatively coupled to the management system 104, or a combination thereof. In various embodiments, the database may be non-volatile storage, including but not limited to flash memory, read-only memory (ROM), ferroelectric random access memory (fRAM), optical discs, solid-state devices (SSD), erasable programmable ROM (EPROM), electrically erasable programmable ROM (EEPROM), among others. The database can be mounted on all host systems 106, 108, 110.

Based on the configuration parameters received through registration of machine learning models, the management system 104 can create a serialized version of the machine learning model that is stored a model container repository 114. The model container repository 114 can one or more non-transitory machine-readable storage media including but not limited to flash memory, read-only memory (ROM), ferroelectric random access memory (fRAM), optical discs, solid-state devices (SSD), erasable programmable ROM (EPROM), electrically erasable programmable ROM (EEPROM), among others. The serialized machine learning models are deployable versions of the machine learning models that can be put into production for use by other systems within the environment 100.

When deploying a machine learning model on a deployment cluster, the management system 104 can mount the serialized version of one or more machine learning models from the repository 114 to the set of virtual nodes comprising the deployment cluster so that the virtual nodes will have access the serialized machine learning model in the repository 114 to be run and accessible on the deployment cluster. In various embodiments, the repository 114 can maintain the raw metadata associated with the machine learning model as well as the serialized machine learning model (which is obtained during registration).

In various embodiments, each machine learning model may have an associated data structure within the management system 104 database, while in other embodiments a data structure may include an entry or row associated with each machine learning model of a plurality of machine learning models registered with the management system 104. The data structure(s) can maintain the configuration parameters associated with each machine learning model, including but not limited to the name of the compute engine associated with the model, the serialization information used for the machine learning model (e.g., serialization format, serialization library, etc.), a list of required compute resources for the machine learning module, version information for the machine learning model, machine learning library(s) used with the machine learning model, among others.

When attaching a machine learning model to a deployment cluster, the management system 104 can use the model metadata stored in the data structure to ensure that the deployment cluster has sufficient compute resources to run the machine learning model. For example, a first machine learning model can be attached to a first deployment cluster 160 (comprising virtual nodes 122 and 124). In deploying the first machine learning model, the management system 104 can identify the compute resources required based on the inference request and determine if the first deployment cluster 160 has sufficient resources. If it does, the management cluster can make available to the virtual nodes 122, 124 the serialized model of the machine learning model from the repository 114 so that the virtual nodes 122, 124 are capable of deserializing and then running the model and service the inference request. If the deployment cluster 160 is determined to not have the required compute resources, the management system 104 can determine whether to scale up or down the first deployment cluster 160 to service the machine learning model. By attaching the machine learning model, the management system 104 can transmit the serialized machine learning code for the first machine learning model to the first deployment cluster 160 and add the metadata for the serialized version of the first machine learning model to the metadata for the cluster 160. The management system 104 can be configured to attach more than one machine learning model with a given deployment cluster (e.g., deployment cluster 180) by adding the metadata for the serialized machine learning model to the metadata of the deployment cluster. In this way, the deployment cluster has access to the configuration parameters for the runtime associated with a machine learning model, which can be used to determine how to execute an inference request for an attached machine learning model without the need to re-instantiate the API server to tie it to the machine learning model. Upon receiving an inference request from the user, the API server at the deployment cluster is capable of identifying the machine learning model requested for the prediction. Once the deployment cluster deduces the target model, the inference request can be encapsulated with the configuration parameters (i.e., serialization information) for the target model (which is available to the deployment cluster through the attachment procedure). In this way, the serialization information required to deserialize the machine learning model is separated from the user interface API call so that the API server is not tied to any specific model. Therefore, unlike current approaches, the deployment clusters in accordance with embodiments of the technology disclosed herein are capable of seamlessly switching between machine learning models for inference requests without the need to expose a new API endpoint for each new model being added (which generally cannot be performed while the deployment cluster is running).

Figure 2:
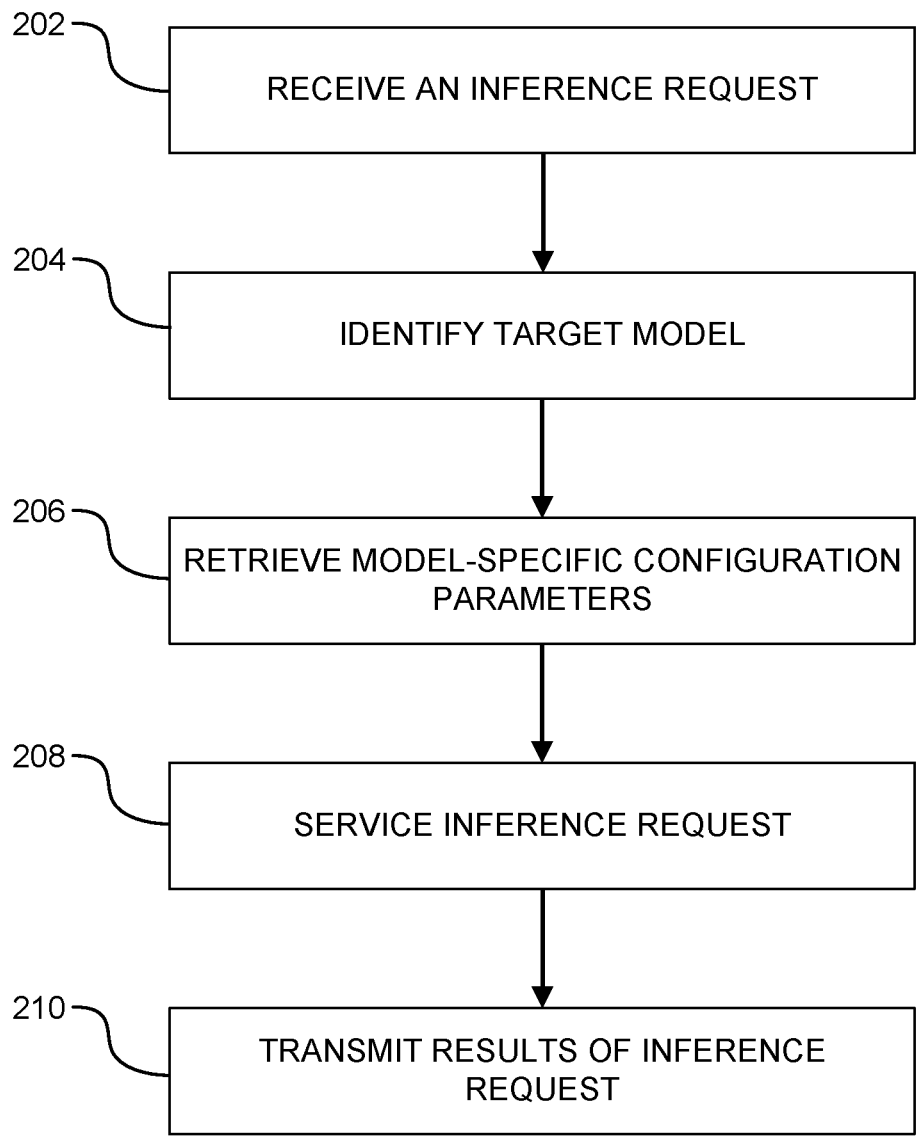
FIG. 2 is an example method in accordance with embodiments of the technology disclosed herein.

FIG. 2 illustrates an example method 200 in accordance with embodiments of the technology disclosed herein. The example method 200 is provided for illustrative purposes only and should not be interpreted as limiting the scope of the claims to only the depicted embodiment. The method 200 shows a process for performing an inference request in accordance with embodiments of the technology disclosed herein. The method 200 can be performed by the deployment cluster receiving the inference request at operation 202. The inference request may be received from one or more business systems, such as the business system 102 discussed with respect to FIG. 1. In various embodiments, the inference request can comprise data to be analyzed by a target machine learning model.

At operation 204, the deployment cluster identifies the target model. The inference request can include an identifier of the machine learning model desired to be used to obtain the inference. In various embodiments, the identifier of the machine learning model can be within the metadata associated with the inference request. In some embodiments, the inference request may include a URL identifying a model name and version type to use for obtaining the inference. Unlike traditional approaches, the serialization information is not encapsulated in the API endpoint through which the inference request is received. Rather, the API server of the deployment cluster is provided with a serialized version of the machine learning model learned through the registration process identifying how the serialization for the machine learning model is performed. In this way, rather than having to wrap the API server around the model specifically, the technology disclosed herein provides a generic API endpoint so that the API server can service multiple different machine learning models where those models utilize the same runtime compute engine. In various embodiments, the deployment cluster can have multiple runtime environments installed. In such embodiments, the deployment cluster can serve inference requests for multiple different machine learning models for which the required runtime environment is installed. The same generic API endpoint can be used for different machine learning models and different runtime environments.

Upon receiving the request, the deployment cluster is capable of determining the target machine learning model and add the serialization information to a service request (e.g., a POST REST request), thereby allowing the information to be plugged into the machine learning model for servicing. Because the configuration parameters for all of the attached models are known to the deployment cluster (through a copy of the parameters being stored in a the data structure stored in the local file system of the host system of the deployment cluster) the deployment cluster can properly deserialize the machine learning model without the need for generating a separate exposed API endpoint for the model. Therefore, models can be added and deleted without the need to create a new access point for the user. In various embodiments, the target model may be identified by a model name and version type included within the inference request.

In response to identify the target model, the deployment cluster retrieves the model-specific configuration parameters at operation 206. As discussed above, the management system maintains the serialization and other configuration parameters defining the runtime environment for each registered machine learning model and transmits that information to the deployment cluster when attaching the model. The deployment cluster stores this received model-specific configuration parameters in a local filesystem for access when needed. After the target model is identified, the deployment cluster can retrieve the model-specific configuration parameters from its local data storage (i.e., on the container file system associated with the host system of the deployment cluster). In various embodiments, the API server of the deployment cluster may retrieve the model-specific configuration parameters. Although discussed as being "local," the data storage of the deployment cluster can also be one or more remote storage systems (e.g., storage area network (SAN)) associated with the deployment cluster. In some embodiments, the API server of the deployment cluster may request from the management system if there are any updates to the model-specific configuration parameters prior to retrieving the model-specific configuration parameters stored in the deployment cluster's data storage.

After retrieving the model-specific configuration parameters, the deployment cluster can service the inference request at operation 208. Using the retrieved parameters, the deployment cluster is aware of the serialization information and can plug the input parameters from the inference request into the machine learning model. In this way, the information can be properly consumed by the targeted machine learning model by encapsulating the data in the format required for the runtime environment. The deployment cluster can add the configuration parameters to a service wrapper for the inference request, adding the serialization information to the request. As such, the inference request can be serviced by the target model. After the inference request is serviced, the deployment cluster can transmit back the results of the analysis by the machine learning model to the source of the inference request. The source (i.e., business system application) can then utilize the results of the machine learning model to provide the required functionality.

Embodiments of the present disclosure enable a deployment cluster to have multiple models available using a generic API endpoint. Each deployment cluster can maintain multiple machine learning models, each having its own configuration parameters but utilizing the same compute engine for the runtime environment. In this way, the API server and deployment cluster can be instantiated without a specific model being tightly coupled to the API server, allowing for inference requests for different models to be serviced by the deployment cluster. Each inference request received can trigger method 200, allowing the deployment cluster to apply serialization and other parameters on the fly in response to the model identified in a given inference request. The inference request can be received through a generic API endpoint access point, without the API endpoint being tied to any specific model. Therefore, while the deployment cluster is running, the model servicing an inference request can be seamlessly switched between models without the need for decoupling the API server from the model servicing the request at the time. The deployment cluster is capable of adding the serialization information and other configuration parameters to the inference request after it is received, thereby allowing the API endpoint exposed to the user to be generic. The deployment cluster can therefor remain running during adding or deleting of machine learning models from the cluster, as well as continuing to run while scaling deployment cluster resources depending on the load.

Figure 3:
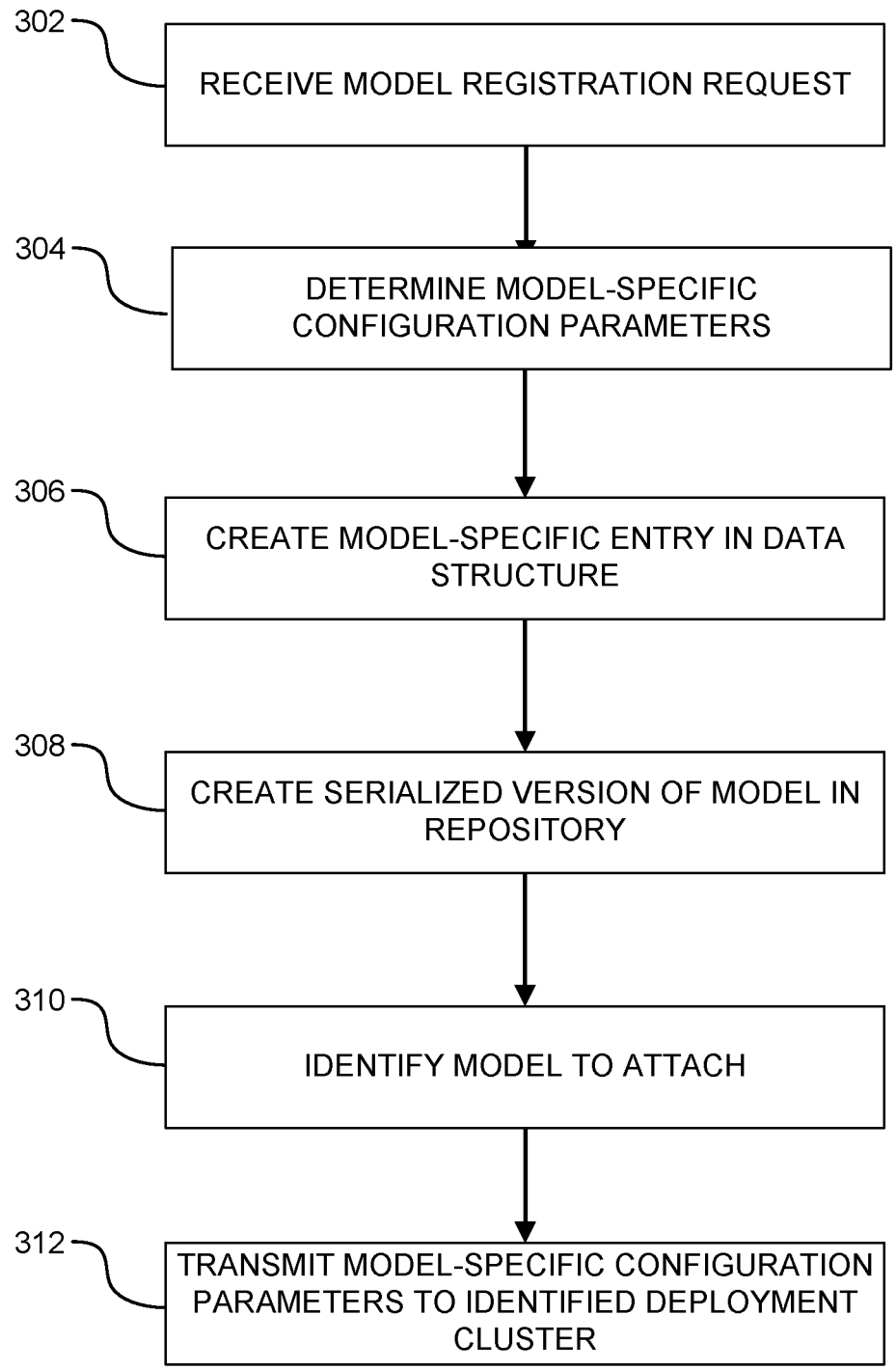
FIG. 3 is another example method in accordance with embodiments of the technology disclosed herein.

As discussed above, the technology disclosed herein enables the API endpoint to remain generic as to the specific machine learning model requested by requiring the serialization and other configuration parameters for the model to be provided during the registration process. This information is maintained by the management system within one or more data structures. FIG. 3 provides another example method 300 in accordance with embodiments of the present disclosure. Like method 200, the method 300 is provided for illustrative purposes only and should not be interpreted to limit the scope of the technology disclosed herein to only the illustrative embodiment. In various embodiments, the method 300 may be performed by a management system, like management system 104 discussed with respect to FIG. 1. In some embodiments, the management system may be a separate host system from the deployment clusters, while in other embodiments the management system may be implemented as a cluster of virtual nodes on one or more host systems.

At operation 302, the management system receives a model registration request. In various embodiments, the registration request may be received during a registration period, while in other embodiments the registration request may be received during normal operation of the computing environment. In this way, machine learning models may be both added to and removed from the computing environment without the need for the system to be shut down. At operation 304, the management system can determine model-specific configuration parameters. In various embodiments, the model-specific configuration parameters can include serialization and other information relevant to defining the runtime environment and compute engine associated with the model to be registered. In some embodiments, the parameters may be determined by examining the metadata associated with the model registration request, while in other embodiments the management system may request the information from the user and determining the parameters comprises receiving the information from the user.

After determining the model-specific configuration parameters, the management system can create a model-specific entry for the data structure at operation 306. As discussed above with respect to FIG. 1, the management system can maintain at least one data structure in a database that includes configuration parameters for each model registered in the system. In some embodiments, creating a model-specific entry can comprise creating a new row within an existing data structure, a new data object within a database file, a new data structure associated with the newly-registered model, or a combination thereof. In some embodiments, the management system may transmit an acknowledgment that the model was registered to the user. Using the configuration parameters received, the management system can then generate a serialized version of the machine learning model and store that version in the model container repository at operation 308. The serialized version is the production model that can be mounted onto the virtual nodes comprising the deployment cluster.

After storing the serialized version of the machine learning model in the repository, the model needs to be deployed or put into production in order to be used. Deployment comprises attaching the registered machine learning model to at least one deployment cluster within the environment. At operation 310, the management system can identify a deployment cluster to attach the model. In some embodiments, based on the requirements, the management system can determine if there is an existing deployment engine with sufficient compute resources to run the machine learning model. In response to identifying a currently configured deployment cluster with sufficient resources, the management system can transmit the model-specific configuration parameters to the deployment cluster at operation 312. This information can be stored in the data repository for the identified deployment cluster. This information may further include mounting the serialized machine learning model in the model container repository, thereby making the serialized machine learning model available to the deployment cluster. If no currently configured deployment cluster is identified, the management system can activate a new deployment cluster by configuring one or more virtual nodes to function as a cluster, and then may transmit the model-specific configuration parameters to the newly-created deployment cluster. In other embodiments, the management system can attach the machine learning model to any deployment cluster without first determining the amount of compute resources available. The compute resources can be scaled based on operational need when running if the management system determines more resources are needed to service a request or the deployment cluster requests resource scaling.

Figure 4:
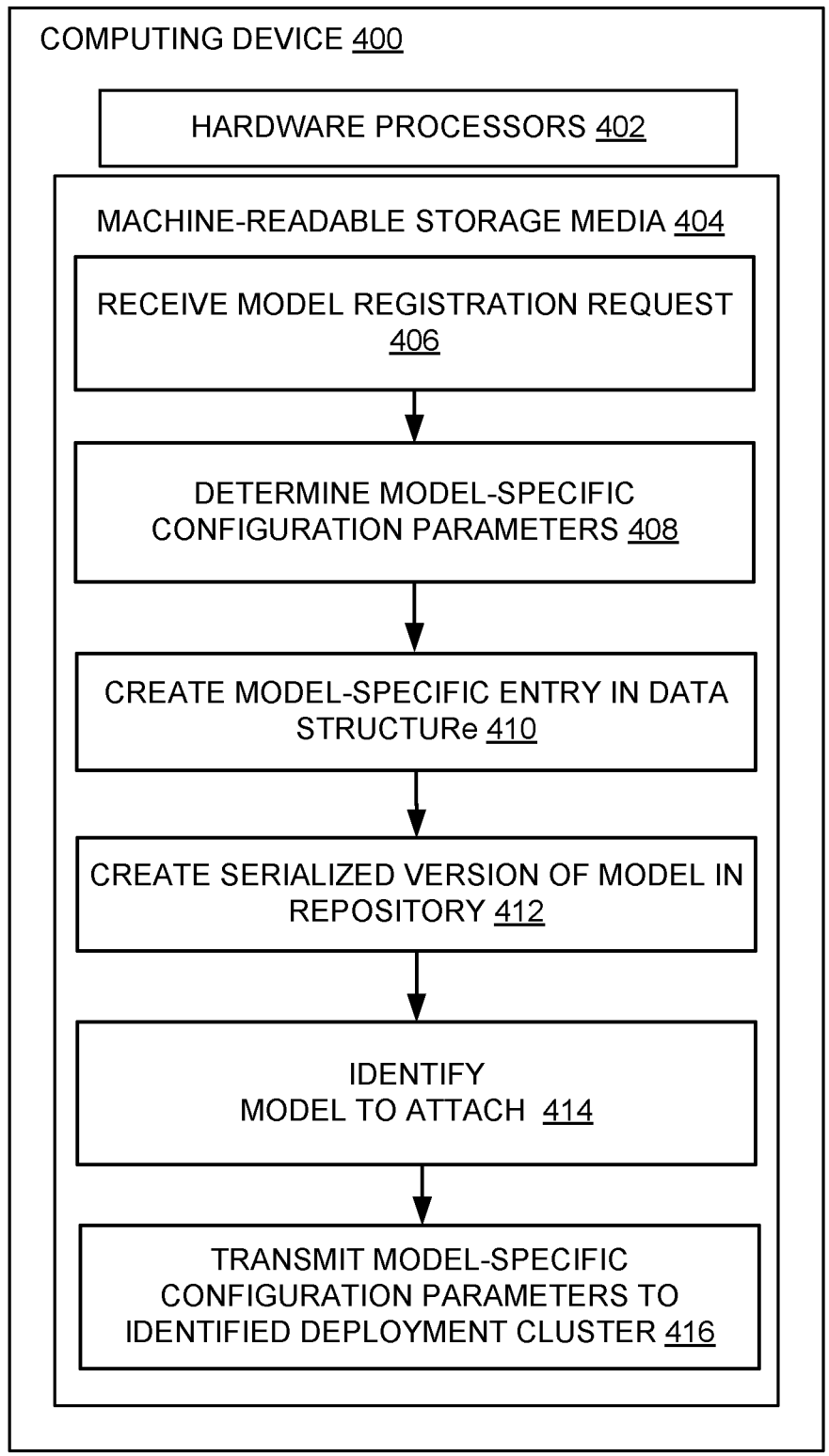
FIG. 4 is an example computing device having non-transitory machine-readable storage with instructions stored thereon in accordance with embodiments of the technology disclosed herein.

FIG. 4 is an example computing device 400 in accordance with embodiments of the present disclosure. Where operations and functionality of computing device 400 are similar to those discussed with respect to FIGS. 1-3, the description should be interpreted to apply. In various embodiments, the computing device 400 may the management system 104 discussed with respect to FIG. 1. The computing device 400 includes hardware processors 402. In various embodiments, hardware processors 402 may include one or more processors.

Hardware processors 402 are configured to execute instructions stored on a machine-readable medium 404. Machine readable medium 404 may be one or more types of non-transitory computer storage mediums. Non-limiting examples include: flash memory, solid state storage devices (SSDs); a storage area network (SAN); removable memory (e.g., memory stick, CD, SD cards, etc.); or internal computer RAM or ROM; among other types of computer storage mediums. The instructions stored on the machine-readable medium 404 may include various sub-instructions for performing the function embodied by the identified functions. For example, the instructions "receive model registration request" 406 may include various sub-instructions for receiving a request to register a new model with the system in a manner similar to that discussed above with respect to FIGS. 1-3. The instruction "determine model-specific configuration parameters" 408 may include sub-instructions for identifying the configuration parameters for models being registered in a manner similar to that discussed with respect to FIGS. 1-3. The instruction 408 may further include sub-instructions for identifying the parameters within the metadata of the model registration request or to request the configuration parameters be entered.

The instruction "create model-specific entry in data structure database" 410 may include sub-instructions for creating a generating a new entry in the data structure in a manner similar to that discussed above with respect to FIGS. 1-3. The instruction 410 may further include sub-instructions for creating a new data structure for the new model or creating a new row in an existing data structure. The instruction "create serialized version of model in repository" 412 can include instructions for adding a serialized version of a machine learning model in a container of the model container repository in a manner similar to that discussed above with respect to FIGS. 1-3. The instruction "identify deployment cluster to attach model" 414 may include instructions for identifying a deployment cluster with sufficient resources to run the machine learning model in a manner similar to that discussed above with respect to FIGS. 1-3. The instructions 414 may further include creating a new deployment cluster if no existing cluster has sufficient compute resources to run the model. The instructions "transmit model-specific configuration parameters to identified deployment cluster" 416 may include sub-instructions to transmit the parameters to the deployment cluster for storage within the data repository of the deployment cluster in a manner similar to that discussed above with respect to FIGS. 1-3.

Figure 5:
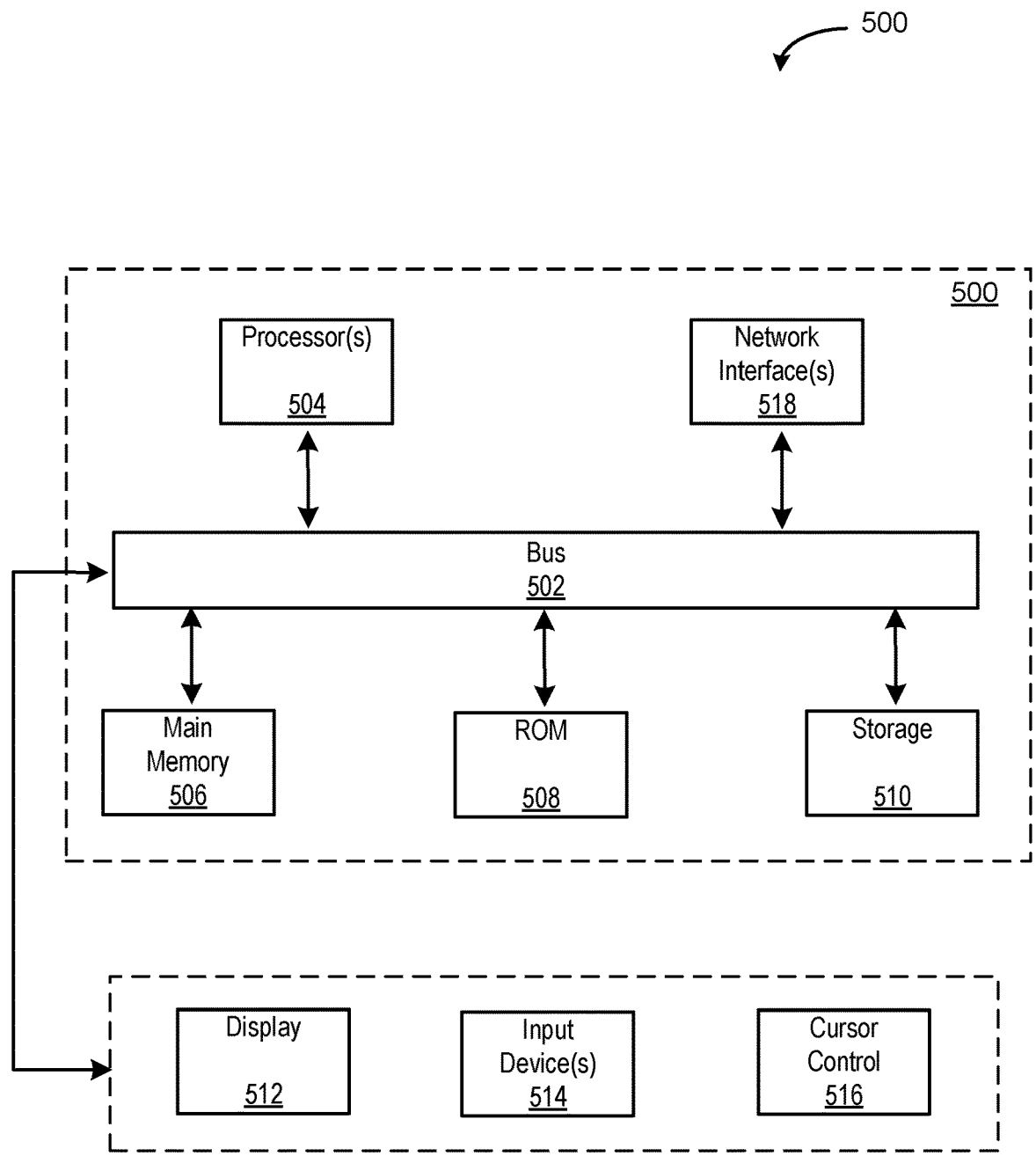
FIG. 5 is an example computing component that may be used to implement various features of embodiments described in the present disclosure.

FIG. 5 depicts a block diagram of an example computer system 500 in which various of the embodiments described herein may be implemented. The computer system 500 includes a bus 502 or other communication mechanism for communicating information, one or more hardware processors 504 coupled with bus 502 for processing information. Hardware processor(s) 504 may be, for example, one or more general purpose microprocessors.

The computer system 500 also includes a main memory 506, such as a random access memory (RAM), cache and/or other dynamic storage devices, coupled to bus 502 for storing information and instructions to be executed by processor 504. Main memory 506 also may be used for storing temporary variables or other intermediate information during execution of instructions to be executed by processor 504. Such instructions, when stored in storage media accessible to processor 504, render computer system 500 into a special-purpose machine that is customized to perform the operations specified in the instructions.

The computer system 500 further includes a read only memory (ROM) 508 or other static storage device coupled to bus 502 for storing static information and instructions for processor 504. A storage device 510, such as a magnetic disk, optical disk, or USB thumb drive (Flash drive), etc., is provided and coupled to bus 502 for storing information and instructions.

The computer system 500 may be coupled via bus 502 to a display 512, such as a liquid crystal display (LCD) (or touch screen), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. In some embodiments, the same direction information and command selections as cursor control may be implemented via receiving touches on a touch screen without a cursor.

The computing system 500 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor(s) 504 executing one or more sequences of one or more instructions contained in main memory 506. Such instructions may be read into main memory 506 from another storage medium, such as storage device 510. Execution of the sequences of instructions contained in main memory 506 causes processor(s) 504 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 510. Volatile media includes dynamic memory, such as main memory 506. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 502. Transmission media can also take the form of acoustic or light waves, such as those generated during radio-wave and infra-red data communications.

The computer system 500 also includes a communication interface 518 coupled to bus 502. Network interface 518 provides a two-way data communication coupling to one or more network links that are connected to one or more local networks. For example, communication interface 518 may be an integrated services digital network (ISDN) card, cable modem, satellite modem, or a modem to provide a data communication connection to a corresponding type of telephone line. As another example, network interface 518 may be a local area network (LAN) card to provide a data communication connection to a compatible LAN (or WAN component to communicated with a WAN). Wireless links may also be implemented. In any such implementation, network interface 518 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 518, which carry the digital data to and from computer system 500, are example forms of transmission media.

The computer system 500 can send messages and receive data, including program code, through the network(s), network link and communication interface 518. In the Internet example, a server might transmit a requested code for an application program through the Internet, the ISP, the local network and the communication interface 518.

The received code may be executed by processor 504 as it is received, and/or stored in storage device 510, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (Saas). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAS, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 500.

It should be noted that the terms "optimize," "optimal" and the like as used herein can be used to mean making or achieving performance as effective or perfect as possible. However, as one of ordinary skill in the art reading this document will recognize, perfection cannot always be achieved. Accordingly, these terms can also encompass making or achieving performance as good or effective as possible or practical under the given circumstances, or making or achieving performance better than that which can be achieved with other settings or parameters.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A method comprising:
   receiving, by an Application Programming Interface (API) server of a deployment cluster, an inference request from a business system application comprising information for a target machine learning model, wherein the inference request is received through an API endpoint exposed by the API server;
   identifying, by the API server of the deployment cluster, the target machine learning model from the information in the inference request;
   retrieving, by the API server of the deployment cluster, model-specific configuration parameters associated with the target machine learning model, wherein the model-specific configuration parameters comprise serialization information for the target machine learning model,
      wherein the serialization information for the target machine learning model is initially separate from the inference request, and
      wherein the serialization information for the target machine learning model is excluded from the API;
   encapsulating, by the API server of the deployment cluster, the inference request in a POST REST request that comprises the serialization information for the target machine learning model;
   servicing, by a runtime environment installed on the deployment cluster, the POST REST request on the target machine learning model based on the model-specific configuration parameters,
      wherein the serialization information is applied to deserialize a serialized version of the target machine learning model, and
      wherein the inference request is serviced absent generating a separate exposed API endpoint for the target machine learning model; and
   transmitting, by the deployment cluster to the business system application, a result of the servicing of the inference request.

2. The method of claim 1, wherein the deployment cluster comprises one or more virtual nodes of one or more host systems communicatively coupled to a management system.

3. The method of claim 2, wherein the API server is configured to expose the API endpoint to the business system application.

4. The method of claim 1, further comprising receiving from a management system the model-specific configuration parameters for the target machine learning model.

5. The method of claim 4, further comprising storing the model-specific configuration parameters for the target machine learning model in a data repository associated with the deployment cluster.

6. The method of claim 1, wherein the target machine learning model comprises one of a plurality of machine learning models attached to the deployment cluster.

7. The method of claim 1, wherein an identification of the target machine learning model is identified from metadata of the inference request.

8. The method of claim 1, further comprising:
receiving a second inference request identifying a second target machine learning model; and
applying model-specific configuration parameters for the second target machine learning model to service the second inference request.

9. The method of claim 1, wherein the serialization information for the target machine learning model comprises a serialization format and a serialization library.

10. The method of claim 1, wherein the deployment cluster is configured to serve inference requests for multiple different machine learning models for which a required runtime environment is installed.

11. The method of claim 1, wherein the target machine learning model is available to the deployment cluster through an attachment procedure.

12. The method of claim 1, wherein the runtime environment is a first runtime environment, and the method further comprises:
configuring the deployment cluster with a second runtime environment.

13. The method of claim 12, further comprising:
servicing, by the second runtime environment installed on the deployment cluster, a service request on a second target machine learning model.

14. A non-transitory machine-readable storage medium storing instructions on a deployment cluster thereon that, when executed by a processor, cause the processor to:
receive, by an Application Programming Interface (API) server of the deployment cluster, an inference request from a business system application comprising information for a target machine learning model, wherein the inference request is received through an API endpoint exposed by the API server;
identify, by the API server of the deployment cluster, the target machine learning model from the information in the inference request;
retrieve, by the API server of the deployment cluster, model-specific configuration parameters associated with the target machine learning model, wherein the model-specific configuration parameters comprise serialization information for the target machine learning model,
wherein the serialization information for the target machine learning model is initially separate from the inference request, and
wherein the serialization information for the target machine learning model is excluded from the API endpoint;
encapsulate, by the API server of the deployment cluster, the inference request in a POST REST request that comprises the serialization information for the target machine learning model;
service, by a runtime environment installed on the deployment cluster, the POST REST request on the target machine learning model based on the model-specific configuration parameters,
wherein the serialization information is applied to deserialize a serialized version of the target machine learning model, and
wherein the inference request is serviced absent generating a separate exposed API endpoint for the target machine learning model; and
transmit, to the business system application, a result of the servicing of the inference request.

15. The non-transitory machine-readable storage medium of claim 14, wherein the deployment cluster comprises one or more virtual nodes of one or more host systems communicatively coupled to a management system.

16. The non-transitory machine-readable storage medium of claim 15, wherein the API server is configured to expose the API endpoint to the business system application.

17. The non-transitory machine-readable storage medium of claim 14, wherein the processor is further caused to:
receive from a management system the model-specific configuration parameters for the target machine learning model.

18. The non-transitory machine-readable storage medium of claim 17, wherein the processor is further caused to:
store the model-specific configuration parameters for the target machine learning model in a data repository associated with the deployment cluster.

19. The non-transitory machine-readable storage medium of claim 14, wherein the target machine learning model comprises one of a plurality of machine learning models attached to the deployment cluster.

20. The non-transitory machine-readable storage medium of claim 14, wherein the processor is further caused to:
receive a second inference request identifying a second target machine learning model; and
apply model-specific configuration parameters for the second target machine learning model to service the second inference request.

21. The non-transitory machine-readable storage medium of claim 14, wherein the deployment cluster is configured to serve inference requests for multiple different machine learning models for which a required runtime environment is installed.

22. The non-transitory machine-readable storage medium of claim 14, wherein the target machine learning model is available to the deployment cluster through an attachment procedure.

23. A deployment cluster comprising:
an Application Programming Interface (API) server;
a runtime environment installed on the deployment cluster;
a processor; and
a memory for storing machine-readable instructions that cause the processor to:
receive, by the API server, an inference request from a business system application comprising information for a target machine learning model;
identify, by the API server, the target machine learning model from the information in the inference request;
retrieve, by the API server, model-specific configuration parameters associated with the target machine learning model, wherein the model-specific configuration parameters comprise serialization information for the target machine learning model,
wherein the serialization information for the target machine learning model is initially separate from the inference request, and
wherein the serialization information for the target machine learning model is excluded from an API endpoint;
encapsulate, by the API server, the inference request in a POST REST request that comprises the serialization information for the target machine learning model;

service, by the runtime environment, the POST REST request on the target machine learning model based on the model-specific configuration parameters
    wherein the serialization information is applied to deserialize a serialized version of the target machine learning model, and
    wherein the inference request is serviced absent generating a separate exposed API endpoint for the target machine learning model; and
transmit, to the business system application, a result of the servicing of the inference request.

24. The deployment cluster of claim 23, wherein the API server is further configured to expose the API endpoint to the business system application.

* * * * *